United States Statutory Invention Registration [19]

[11] Reg. Number: H442

Clark

[43] Published: Mar. 1, 1988

[54] COMPOSITION AND METHOD FOR CLEANING EMBEDDED SOIL FROM SURFACES HAVING LOW GLOSS COATINGS

[75] Inventor: Kenneth G. Clark, Chalfont, Pa.

[73] Assignee: The United States of America as represented by the Secretary of the Navy, Washington, D.C.

[21] Appl. No.: 600,876

[22] Filed: Apr. 16, 1984

[51] Int. Cl.[4] ..... C09D 9/02; C11D 7/50; C11D 17/00; C23G 5/032

[52] U.S. Cl. ..... 252/163; 252/164; 252/91; 252/174.23

[58] Field of Search ..... 252/88, 91, 89.1, 162, 252/163, 164, 165, 166, 167, 168, 174.23

[56] References Cited

U.S. PATENT DOCUMENTS

| | | | |
|---|---|---|---|
| 2,901,383 | 8/1959 | Lebsanft et al. | 134/7 |
| 3,716,066 | 2/1975 | Currier et al. | 239/142 |
| 3,748,268 | 7/1973 | Loudas | 252/90 |
| 3,775,052 | 11/1973 | Van Paassen | 252/174.21 |
| 3,819,525 | 6/1974 | Hattenbrun | 252/174.23 |
| 3,910,848 | 10/1975 | Froehlich et al. | 252/90 |
| 3,910,848 | 10/1975 | Froehlich et al. | 252/DIG. 2 |
| 3,956,162 | 5/1976 | Lautenberger | 252/162 |
| 4,013,594 | 3/1977 | Froehlich et al. | 252/544 |
| 4,013,594 | 3/1977 | Froehlich et al. | 252/544 |
| 4,108,800 | 8/1978 | Froehlich | 252/541 |
| 4,434,067 | 2/1984 | Malone et al. | 252/88 |
| 4,440,661 | 3/1984 | Takeuchi et al. | 252/89.1 |
| 4,481,126 | 11/1984 | Trinh et al. | 252/174.23 |

FOREIGN PATENT DOCUMENTS

| | | |
|---|---|---|
| 2021677 | 12/1971 | Fed. Rep. of Germany . |
| 2240287 | 4/1975 | France . |
| 7704439 | 10/1977 | Netherlands . |

*Primary Examiner*—Teddy S. Gron
*Assistant Examiner*—J. E. Thomas
*Attorney, Agent, or Firm*—Henry Hansen

[57] ABSTRACT

A composition for cleaning embedded soil from surfaces coated with flat or low-gloss coatings has elastomeric particles intermixed with a thixotropic solvent emulsion cleaner. The elastomeric particles provide an eraser-like action to adsorb deeply entrapped soil so that the cleaner can emulsify or dissolve the soil and wash it away.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITION AND METHOD FOR CLEANING EMBEDDED SOIL FROM SURFACES HAVING LOW GLOSS COATINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to cleaning solutions, and more particularly to a composition and method for removing embedded soil from surfaces having flat or very low gloss coatings without increasing the gloss of the coating.

The use of flat or very low gloss coatings on the exterior surfaces of aircraft and other weapons systems presents a serious cleaning problem. Due to the nature of the coating soil entrapped therein is extremely difficult to remove by conventional cleaning means.

For example, with non-abrasive, solvent emulsion cleaners the cleaning efficiency is directly related to the degree of gloss of the coating. The lower the gloss, the lower is the cleaning efficiency. In fact, test panels which have been cleaned using these cleaners appear badly soiled even when cleaning efficiencies of 80 percent were achieved.

Alternatively, abrasive cleaners have been tried. Since carbon and dirt particles are known to require mechanical agitation to be removed from flat or low gloss surfaces, it would appear that abrasive cleaners would provide an obvious answer to this cleaning problem. However, abrasive cleaners tend to increase the gloss of the coating, thereby undesirably affecting the camouflage quality of the coating.

SUMMARY OF THE INVENTION

Accordingly, one object of this invention is to remove embedded soil from a surface coated with a flat or low-gloss coating.

Another object of this invention is to clean flat or low-gloss surfaces without increasing the gloss of said surfaces.

A further object of this invention is to improve the cleaning efficiency of solvent emulsion cleaners on flat or low-gloss surfaces.

The above and other objects are realized by a cleaning composition consisting of a solvent emulsion cleaner, preferably of the thixotropic type, to which minute elastomeric or rubber particles are added. The composition is applied to the soiled surface with moderate agitation and then rinsed off.

Other objects, advantages, and novel features of the invention will become apparent from the detailed description of the invention which follows.

DETAILED DESCRIPTION OF THE INVENTION

A cleaning composition according to the present invention can be prepared by the addition of minute adsorbent elastomeric particles to a thixotropic, nonabrasive, solvent emulsion cleaner. Such a cleaner is preferred since sufficient viscosity is needed to transmit the shear forces of cleaning to the base of the pores in the low-gloss coating. Additionally, thixotropic cleaners are more suitable since their relatively high viscosity at rest would prevent floating or settling of the elastomeric particles. In other words the particles would remain suspended.

Thixotropic cleaning fluids containing solvents such as aromatic hydrocarbons, olefinic hydrocarbons, aliphatic hydrocarbons, glycols, glycol ethers, ethers, esters, and alcohols would be suitable for removing greasy or oily soils. Non-solvent thixotropic fluid cleaners such as aqueous solutions of detergents would be suitable for removing polar soils such as silica dust, salts, and other inorganic particulate matter.

There are several types of elastomers particles of which may be used in the composition of the subject invention. For example, any of the following would be suitable: acrylic elastomers, chlorinated polyethylene elastomers, nitrile elastomers, polybutadiene elastomers, polychloroprene elastomers, polyisobutylene elastomers, polysulfide elastomers, silicone elastomers, styrene-butadiene copolymers, styrene-isoprene elastomers, thermoplastic polyester elastomers, thermoplastic polyolefin elastomers, urethane elastomers, vinyl acetate/ethylene copolymers, and, of course, natural rubbers.

The optimum elastomeric particle content would depend on the chemical nature of the elastomer, the particle size distribution, and the nature of the cleaning solvent compound to which the elastomer is added. However, in most cases, a concentration of 10% by weight elastomeric particles will provide the optimum cleaning efficiency.

Particle size distribution is also an important consideration. Particle sizes in the range of 6 to 30 mils have been found to be very effective in adsorbing entrapped soil. The elastomeric or rubber particles behave like tiny erasers which mechanically remove entrapped soil much like a pencil eraser. Therefore, the actual size or sizes of particles will depend, not only on the nature of the soil to be removed, but also on the low-gloss coating pore size.

The cleaning compositions described above maybe used by application to the soiled surface with a nonabrasive cleaning pad. The composition should be allowed to dwell for a short time (one to three minutes at 20° C. should be sufficient). Agitation with moderate pressure on the cleaning pad is then applied until a satisfactory degree of cleaning is achieved. The coated surface may then be rinsed to remove the rubber particle residue.

Some of the many advantages and novel features of the above-disclosed invention should now be apparent in view of the foregoing description. A cleaning composition has been described which is capable of removing embedded soil from a flat-coated or low-gloss surface. Moreover, use of the disclosed composition will not increase the gloss of the surface. Furthermore, the composition is a very efficient cleaner of such low-gloss surfaces because of the eraser-like action of the elastomeric particles.

Numerous additional modifications and variations are possible in light of the above teachings. It is therefore to be understood that within the scope of the appended claims, the invention may be practiced otherwise than as specifically described herein.

What is claimed is:

1. A composition for cleaning embedded soil from a surface having a flat or low-gloss coating, said composition consisting of:

about 90% by weight of a non-abrasive thixotropic cleaning fluid; and about 10% by weight of 6 to 30 mil particles of an elastomeric material selected from the group consisting of acrylic elastomers, chlorinated polyethylene elastomers, nitrile elastomers, polybutadiene elastomers, polychloroprene elastomers, polyisobutylene elastomers, polysulfide elastomers, silicone elastomers, styrene-butadiene copolymers, styrene-isoprene elastomers, thermoplastic polyester elastomers, thermoplastic polyolefin elastomers, urethane elastomers, vinyl acetate/ethylene copolymers, and natural rubbers.

* * * * *